United States Patent [19]
Egner-Walter et al.

[11] Patent Number: 4,625,359
[45] Date of Patent: Dec. 2, 1986

[54] WINDSHIELD WIPER UNIT

[75] Inventors: Bruno Egner-Walter, Heilbronn; Eckhardt Schmid, Brackenheim; Wolfgang Scholl, Gemmrigheim; Anton Epple, Rottenburg; Hans Trube, Herrenberg; Martin Pfeiffer, Stuttgart; Josef Berger, Wolfschlugen; Egon Frey, Sindelfingen, all of Fed. Rep. of Germany

[73] Assignees: SWF-Spezialfabrik fur Autozubehor Gustav Rau GmbH, Bietigheim-Bissingen; Daimler-Benz Aktiengesellschaft, Stuttgart, both of Fed. Rep. of Germany

[21] Appl. No.: 627,809

[22] Filed: Jul. 5, 1984

[30] Foreign Application Priority Data

Jul. 8, 1983 [DE] Fed. Rep. of Germany ....... 3324634

[51] Int. Cl.⁴ .............................................. B60S 1/26
[52] U.S. Cl. ................................ 15/250.21; 15/250.23
[58] Field of Search .......... 15/250.23, 250.21, 250.29, 15/250.13, 250.30, 250.39

[56] References Cited

U.S. PATENT DOCUMENTS 3,831,220 8/1974 Gmeiner et al. ............. 15/250.23 X
3,831,221 8/1974 Gmeiner et al. ................. 15/250.21
4,447,928 5/1984 Schüch et al. ............... 15/250.23 X Primary Examiner—Peter Feldman
Attorney, Agent, or Firm—Donald J. Lenkszus

[57] ABSTRACT

A windshield wiper unit with a wiper arm of telescopic construction which has a housing driven to and fro round an axis of rotation by a driving motor and a slide movable in relation to the housing, this slide being displaceable by a crank assembly is so designed that the various bearings are subjected to little load and so that compact construction is possible. This is achieved by having the connecting rod belonging to the crank assembly above or below the slide and linked to the slide between the two bearings for it and by having the distance between the two bearings at least as great as the stroke of the slide.

34 Claims, 8 Drawing Figures

WINDSHIELD WIPER UNIT

BACKGROUND OF THE INVENTION

The invention pertains to a windshield wiper unit which is used especially for motor vehicles.

More specifically the invention pertains to a windshield wiper having a wiper arm of telescopic construction which has a housing driven by a driving motor to an fro about an axis of rotation. Such a wiper arm has a slide movable in relation to the housing. The slide is supported in two bearings in the housing spaced apart from each other and has a length at least equal to the distance between the bearing plus the stroke. The displacement is achieved via a connecting rod linked to the slide and a crank linked to the connecting rod. The crank has a fixed axis of rotation relative to the housing and is driven by a gear.

Such a windshield wiper unit is known from DE-PS 31 25 628. In this unit the slide, which is normally movable in a radial direction in relation to the axis of rotation of the driven housing, is supported in two friction bearings of the housing. The distance between the bearings is about two-thirds of the length of the slide. The axis of rotation of the housing is comparable with the axis of the wiper shaft of an ordinary windshield wiper unit without an extendable wiper arm. The friction bearing which is nearest to the axis of rotation will be referred to hereinafter as the rear bearing and the other friction bearing will be referred to as the front bearing.

Linked to the rear end of the slide is a connecting rod which is furthermore linked to a crank. The axis of rotation of the crank coincides with the axis of rotation of the driven housing. The axis of rotation of the crank is therefore simultaneously fixed in relation to the vehicle and in relation to the housing. The crank is unrotatably connected with a gear wheel. The gear wheel is driven, via a pinion with an axle which is fixed in relation to the vehicle by an internal gear ring of the housing which moves to and fro. The center axis of the internal gear ring coincides with the axis of rotation of the housing.

It is not absolutely necessary for the axis of rotation of the crank to be identical with the axis of rotation of the housing which moves to and fro. As shown by DE-OS 22 15 307, a gear ring whose axis of rotation coincides with the axis of rotation of the housing which moves to and fro is arranged so as to be fixed in relation to the vehicle, while the axis of rotation of the crank and of the gear wheel non-rotatably connected with it is outside the axis of rotation of the housing and fixed only in relation to the housing. With this design, too, it is simplest if the axis of rotation of the crank runs parallel to the axis of rotation of the housing and intersects a straight line determined by the longitudinal direction of the slide.

In the known windshield wiper systems, the unit consisting of the slide and the drive of the slide is altogether very long. Furthermore, there is a relatively heavy load on the bearings.

SUMMARY OF THE INVENTION

It is an object of the invention to provide a windshield wiper unit in which the load on the bearings is reduced and which is of compact construction, especially in the longitudinal direction of the slide.

According to the invention, these and other objects are achieved, by having the connecting rod located over or under the slide and linked to the slide between the two bearings and having the distance between the two bearings at least as large as the stroke of the slide.

Whereas, in the aforementioned prior art the greatest distance between one of the bearings and the point where the connecting rod is linked to the slide is at least as large as the stroke of the slide, in the windshield wiper unit according to the invention, the greatest distance between the linking place and one of the two bearings is in the most favorable case only half as much as the stroke of the slide. The distance between the two bearings will consequently be greater than the stroke of the slide because space must be available for fastening the connecting rod to the slide. The short distance of the linking place between the connecting rod and the slide from the two bearings means that these parts are subjected to only a slight load by the forces exerted by the connecting rod. The arrangement of the connecting rod above or below the slide allows the slide to be constructed so that it is short in the longitudinal direction of the slide. The connecting rod is under the slide if it is fitted on the same side as the crank. When fitted on the opposite side, it is above the slide.

In a preferred embodiment, the distance between the crank axis and the rear bearing is smaller than the length of the crank. This construction ensures that the free end of the crank with the end of the connecting rod which is linked to it there does not at any point in its circular path project beyond the rear end of the slide and can pass under the slide between the two bearings.

To obtain the flattest possible construction, it is advantageous if the connecting rod has an offset section with which it passes under the rear bearing. If the distance between the crank and the connecting rod in the direction of the axis of rotation of the crank is very small, the offset section will be further away from the link between the connecting rod and the crank than the length of the crank. With a double offset the connecting rod can be brought nearer again to the slide, so that the leverage distance of the forces exerted by the connecting rod tending to twist the slide is small. Providing the slide with two sections of different cross-section, the section with the smaller cross-section being placed in the rear housing, also contributes to a flat construction.

If the housing which is driven to and fro consists of several component parts, it is favorable if the two bearings are in the same component part of the housing made as a single piece. Their alignment with each other is not influenced by tolerances of different component parts. To compensate for such tolerances in alignment, which cannot be completely avoided, at least one of the two bearings may be constructed as a spherical segment bearing. In a preferred embodiment of the invention it is possible to remove two recesses for the bearings from the mould in the same direction, so that their alignment with each other is further improved.

To reduce the strain on the links between the crank and the connecting rod and between the connecting rod and the slide a guide is provided for the slide which absorbs the torsional forces exerted on the slide.

The wear on various bearings and links is also reduced if the crank has a counter-weight on the other side of its axis if a damping element is inserted in the connecting rod or if the two links between the crank and the connecting rod and between the connecting rod and the slide are ball-and-socket joints.

Certain advantageous embodiments according to the invention provide that the interior of the housing which is driven to and fro and the space in which the gear for driving the crank is located is well sealed against each other.

BRIEF DESCRIPTION OF THE DRAWINGS

Several examples of embodiment of a windshield wiper unit according to the invention are shown in the drawings. The invention will now be explained in greater detail with reference to these drawings, in which.

DETAILED DESCRIPTION

Figure 1:
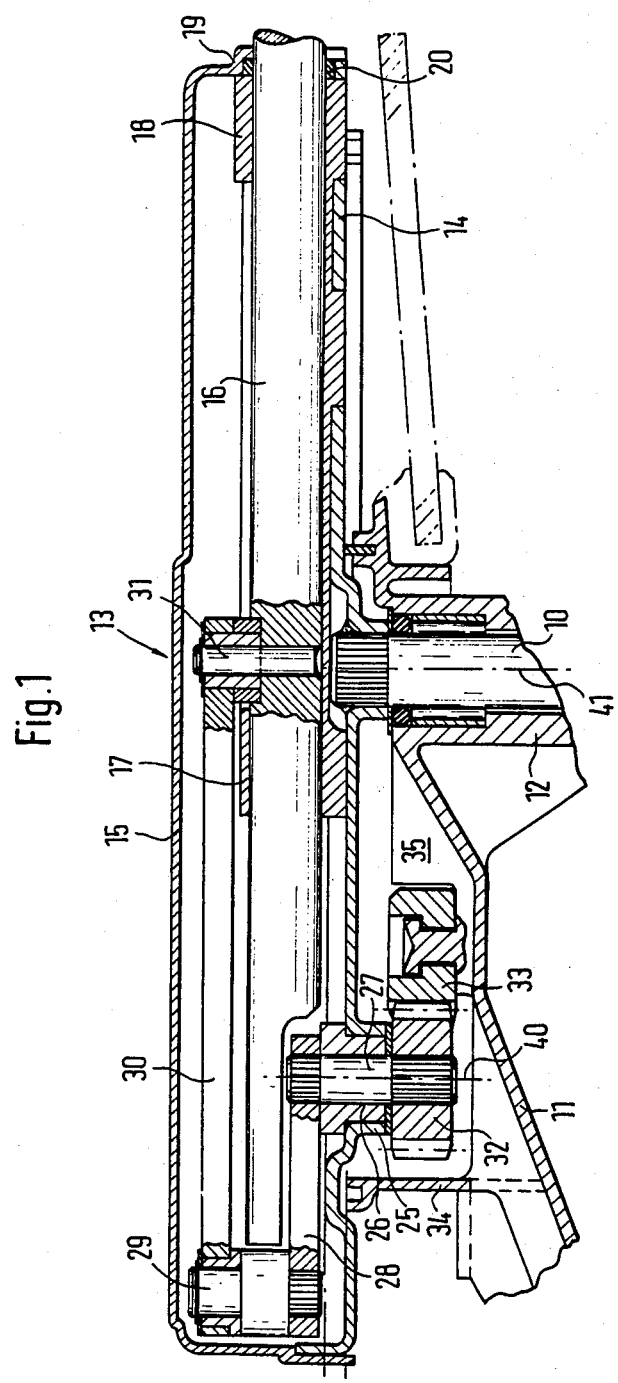
FIG. 1 shows a first embodiment in which the crank and the connecting rod are on opposite sides of the slide.

In the windshield wiper unit according to the invention the wiper arm is, as in customary windshield wiper units with a wiper arm unchangeable in length, driven to and fro by a wiper shaft 10 which is rotatably supported in a bushing 12 made as a single piece with a supporting frame 11. The supporting frame 11 is provided for securing the unit to the body of a motor vehicle. Attached unrotatably to the wiper shaft 10 is a housing 13 which is part of the wiper arm and is composed of two component parts, namely a base-plate 14 and a cover 15. The base-plate 14 is attached to the wiper shaft 10. Inside the housing 13 a slide 16 is supported in two bearings 17 and 18 in such a way that it can be displaced in a radial direction in relation to the axis of rotation of the wiper shaft 10. The slide 16 protrudes from the housing 13 on the front side 19. The bearing 18, the front bearing, is immediately adjacent to the front side 19 of the housing 13. In front of it there is a seal 20 intended to prevent dirt from penetrating into the interior of the housing between the housing 13 and the slide 16. The rear bearing 17 is at a distance from bearing 18 which is somewhat greater than the stroke envisaged from the slide.

Viewed from the front 19 of the housing 13, behind the wiper shaft 10, the base-plate 14 contains a sleeve 25, which basically extends from the interior of the housing 13 outwards. Inserted with a press fit in the sleeve 25 is a bearing bushing 26, which in turn accommodates a crank shaft 27. The axis of the crank shaft 27 is parallel to the axis of the wiper shaft 10 and, like the axis of the wiper shaft, intersects a central straight line running in the longitudinal direction of the slide 16.

The crank shaft 26 protrudes on the one side into the interior of the housing 13 and projects on the other side beyond the sleeve 25 of the base-plate 14. Of the knurled, projecting parts, the one bears on it within the housing 13 and secured against rotation a crank 28, to the free end of which a connecting rod 30 is linked via a pin 29. In all the windshield wiper units according to the invention which are shown, this connecting rod 30, viewed in the longitudinal direction of the slide 16 and disregarding the oblique positioning of the connecting rod 30 between its dead centers, is beside the slide 16. Via a pin 31 it is linked to the slide 16 with its front end between the two bearings 17 and 18. As the figures show, the linking place is in the vicinity of the rear bearing 17 when the slide 16 is pushed back. If the side 16 is extended, the linking place comes into the vicinity of the front bearing 18.

Fixed to the other knurled section of the crankshaft 27, non-rotatably, is a gear wheel 32, which meshes with a gear ring 33 immovably supported by the frame 11. The space in which the gear wheel 32 and the gear ring 33 are located is closed by a wall 34 which extends from the supporting frame 11 to the base-plate 14 of the housing 13, so that a housing 35 is formed.

In the embodiment shown in FIG. 1, the gear ring 33 is toothed on the outside. The distance between the axis 40 of the crank 28 and the rear bearing 17 of the slide 16 is greater than the distance between the free end of the crank 28 and the axis 40, so that the crank, as it rotates, can pass behind the bearing 17. The crank 28 and the connecting rod 30 are linked to each other behind the slide 16. The connecting rod 30 is on the side of the slide 16 opposite to the crank 28. In order to obtain a flat construction, the slide 16 is stepped at its rear end. The space thus made available is used by the crank 28 over about half a revolution.

The embodiment shown in FIG. 1 is drawn in a position in which the slide 16 is fully withdrawn. If the wiper shaft 10 now turns, it carries with it the housing 13 and also the crankshaft 27 with the gear wheel 32. As the latter engages with the gear ring 33, it performs, in relation to the housing 13, a rotary movement which it also transfers to the crank 28. The crank 28 therefore rotates and pushes the slide 16 forward with the connecting rod 30, so that the wiper arm becomes longer. A radial movement is thus superimposed on the to and fro movement of the wiper arm. How many strokes are made during half a wiping cycle depends on the gear ratio between the gear ring 33 and the gear wheel 32. With the windshields which are at present customary, this ratio will be chosen so that the crank 28 performs about two revolutions during this time, the slide 16 being withdrawn a large distance in the parking position of the wiper arm.

In the embodiment shown in FIGS. 2 to 5 the slide 16 has two sections 42 and 43 each with a circular cross-section. The sections are arranged concentrically in relation to each other and have different diameters. In the fully withdrawn position of the slide 16, the section 42 with the larger diameter extends from the front to close to the rear bearing 17. The section 43 is adjacent to the section 42 and is in the bearing 17 throughout the entire stroke. Corresponding to the different diameters of sections 42 and 43, the bearings 17 and 18 also have different diameters. The two bearings are inserted in a recess 44 and 45 respectively, moulded in a single piece to the cover 15 of the housing 13. Both recesses 44 and 45 have at their rear end an inward-turned flange 46 and 47 respectively, which serves as an abutment for the corresponding bearing 17 or 18. Care is taken to ensure that the flange 47 of the front recess 45 does not at any place protrude into the internal cross-section of the rear recess 44. This makes it possible for both recesses 44 and 45 to be removed from the mould in the same direction during production. The tool section for moulding recess 44 can therefore pass through recess 45.

The recess 44 for the bearing 17 extends further downwards from the cover 15 of the housing 13 to the base-plate 14 than the distance which separates the upper side of the connecting rod 30 facing towards the slide 16 at the linking place between it and the crank 28 from the base plate 14. This is possible because the connecting rod 30 has an offset section 50 with which it can get past the recess 44 as far as the linking place between it and the slide 16. As the distance between the connecting rod 30 and the crank 28 in the direction of the axis 40 is kept very small, the offset section 50 only begins at a distance from the linking place between the crank 28 and the connecting rod 30 which is greater than the length of the crank. Consequently, due to the small diameter of the section 43 of the slide 16 and due to the offset 50 of the connecting rod 30, the overall height of the housing 13 determined by the thickness of the crank 28, the thickness of the connecting rod 30 and the diameter of section 43 of the slide 16 on the one hand and by the height of the recess 44 and the thickness and position of the connecting rod 30 on the other hand can be kept small. The connecting rod 30 is however, linked to the thicker section 42 of the slide 16 via the pin 31, so that there is no danger of deformation or breaking at the linking place.

The recess 44 for the rear bearing 17 is between the front bearing 18 and the crank axis 40 at a distance from the latter which is appreciably smaller than the length of the crank. This ensures that the section of the connecting rod 30 which is not offset and the link pin 29 can pass through under the slide 16 between the two bearings 17 and 18. Of course the lateral reinforcing ribs 51 for the recess 44 which are visible in FIGS. 3 and 4 must not extend so far downwards towards the base-plate 14 as the recess 44 itself.

The gear ring 33 with which the gear wheel 32 meshes is toothed on the inside in the embodiment shown in FIGS. 2 to 5. It extends in an approximate semicircle around the axis 41 of the wiper shaft 10 as the central axis. With the wall 34 it extends as far as the base-plate 14 and is provided there with a collar 52 which is turned towards the outside of the wall 34 and enters an annular slot 53 formed by the housing 13. Thereby the interior of the housing 35 is sealed from the outside ina labyrinth-like manner. Approximately in the range of movement of the crank 28 the annular slot is formed in the base-plate 14 of the housing 13. So that the housing 35 shall be covered in every position of the housing 13, the latter has a plate-like section 54 and 55, respectively, on the base-plate 14 and also on the cover 15. Outside the range of movement of the crank 28 the inner side of the annular slot 53 is formed by a collar 56 on the plate 54 of the base-plate 14 and the outer side of the annular slot 53 is formed by a collar 57 on the plate 55 of the cover 15. This is particularly clearly discernable in FIG. 5. Because the cover 15 is also provided with a plate and overlaps both the plate of the base-plate 14 and the wall 34, a particularly good sealing of the interior of housings 13 and 35 from each other and outwards is obtained.

As the wiper blade carried by the wiper arm opposes a resistance to its movement over the windshield and as the connecting rod is fixed on one side to the slide 16 and exerts a force exactly in the longitudinal direction of the slide only at two points, torsional forces work on the slide 16 during operation. To enable these to be absorbed, a part 60 with two flat faces is inserted in a corresponding recess 61 in the slide 16 open towards the rear end of the slide 16 and is secured with a pin 62. The part 60 with two flat faces belongs to a round bolt 63 which extends the same distance perpendicularly to both sides of the slide 16 and carries on each of two pivot pins 64 at its two ends a roller 65. The rollers 65 are guided in two slots 66 running parallel to the slide 16 in the cover 15 of the housing 13. The one guide surface for the roller 65 is formed by rails 67 which are fixed to the cover 15. The distance between the two guide surfaces of the slots 66 is somewhat greater than the outside diameter of the rollers 65, so that jamming is prevented but only a very small rotation of the slide 16 is possible.

Figure 6:
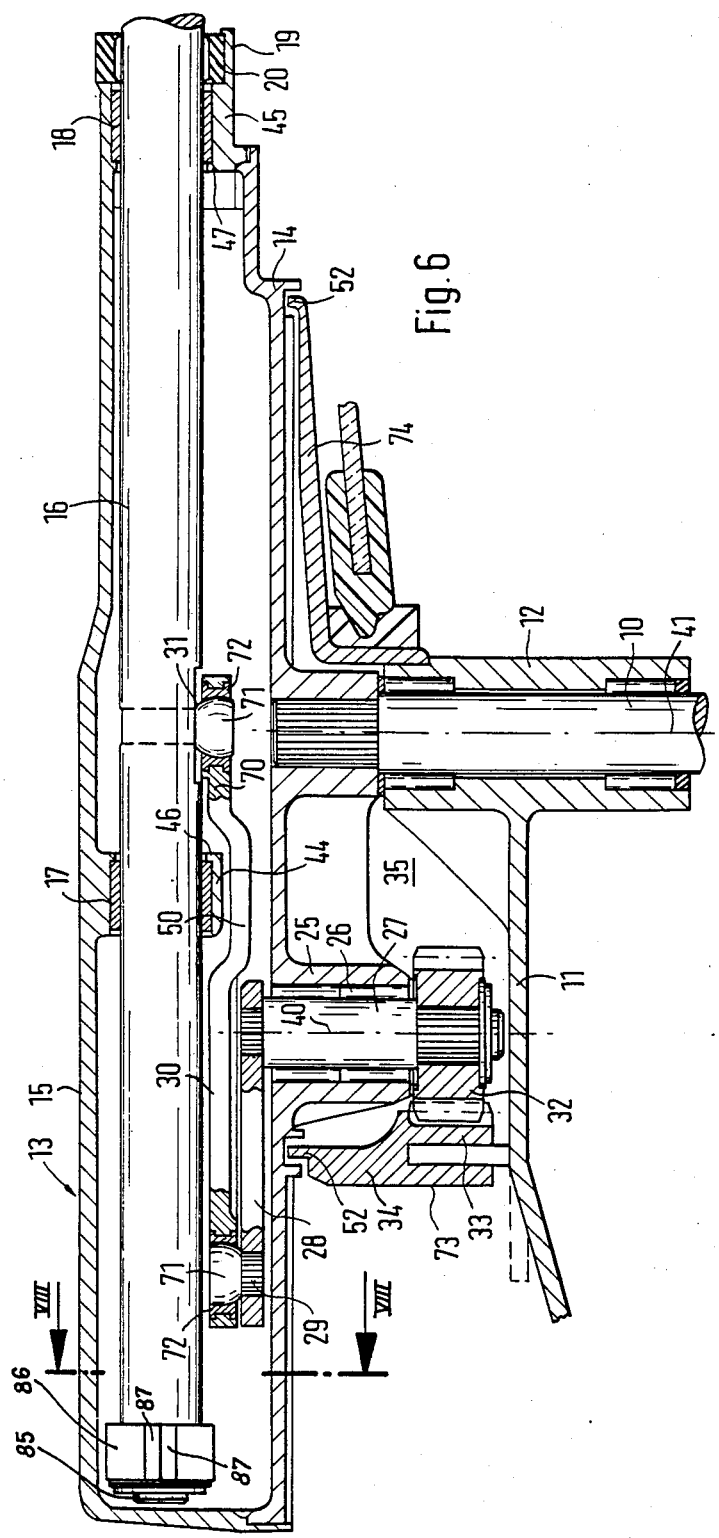
FIG. 6 shows a third embodiment with a doubly offset connecting rod.

The embodiment shown in FIG. 6 is basically constructed in the same way as the embodiment shown in FIGS. 2 to 5. Details will therefore be given only of the features whereby the embodiment shown in FIG. 6 differs from that shown in FIGS. 2 to 5.

Figure 2:
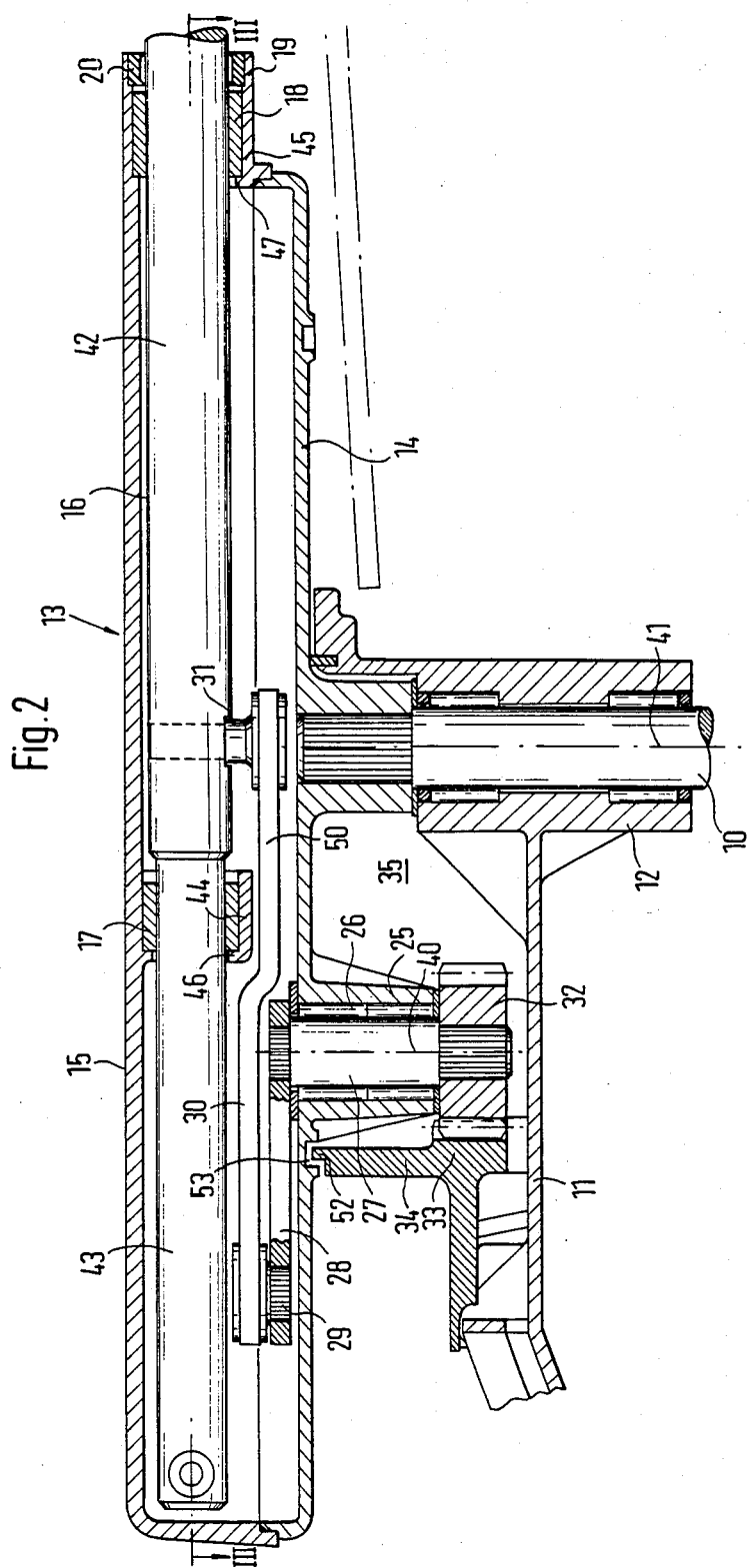
FIG. 2 shows an embodiment with a single offset connecting rod and a slide with two sections of different cross section.
Figure 3:
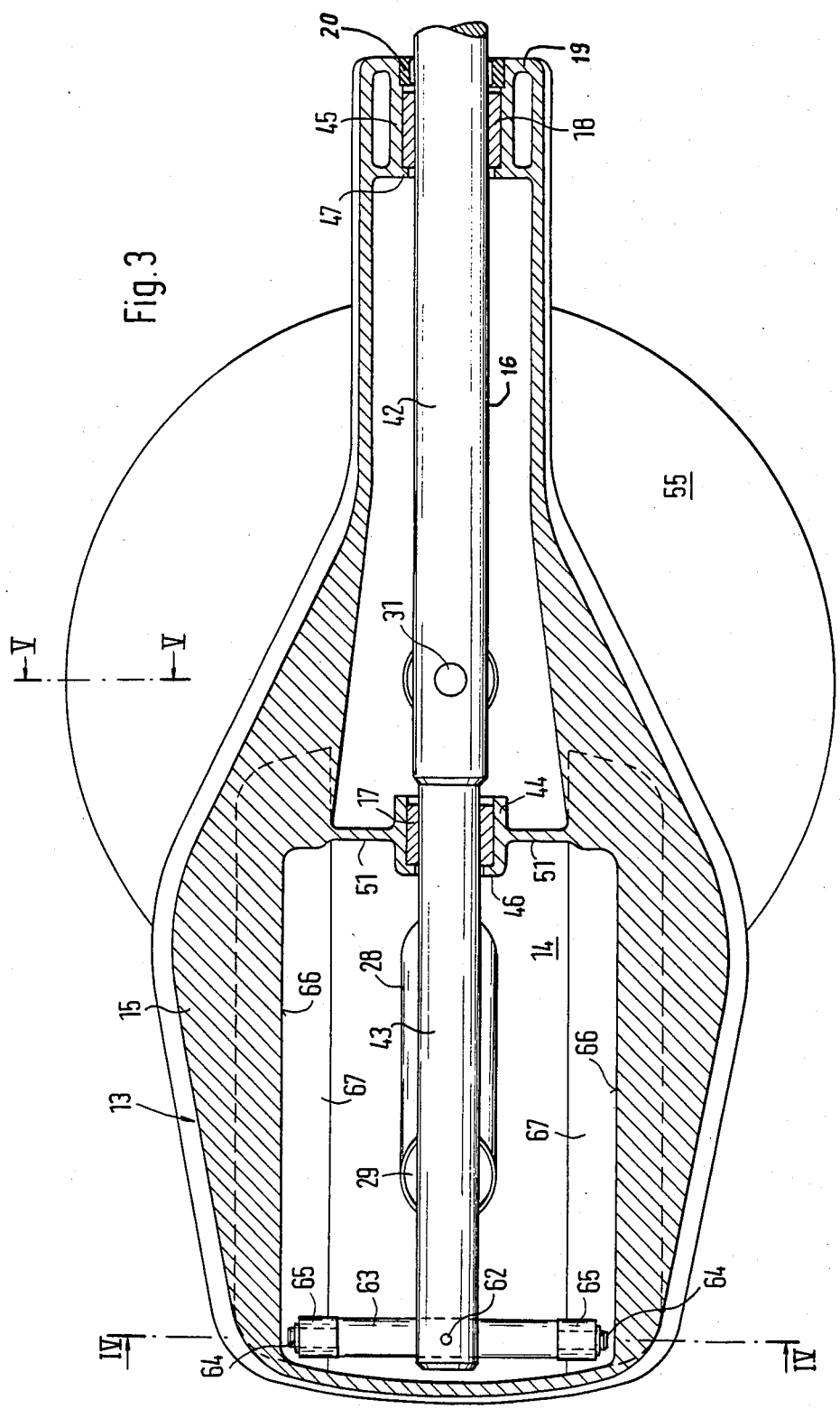
FIG. 3 shows a cross-section along the line III—III in FIG. 2.
Figure 4:
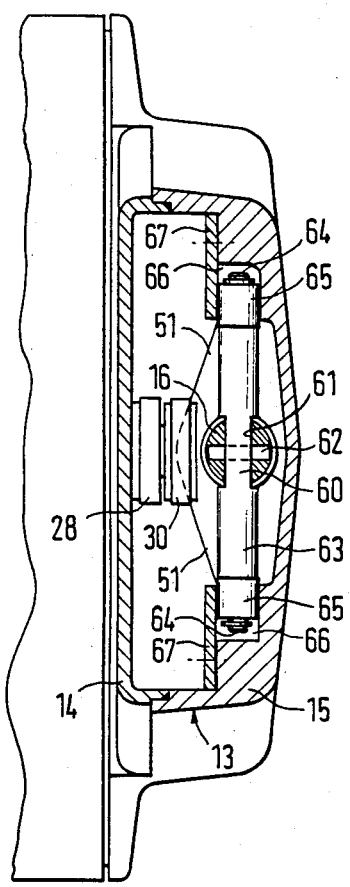
FIG. 4 shows a section along the line IV—IV in FIG. 3.
Figure 5:
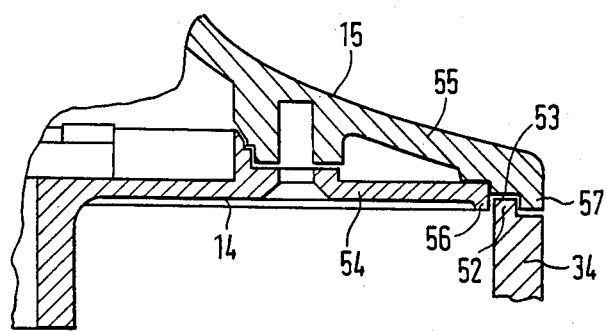
FIG. 5 shows a cross-section along line V—V in FIG. 3.

The slide 16 according to FIG. 6 has the same cross-section over its entire length. It is therefore simpler to produce than the slide 16 according to FIG. 2. Corresponding to the same cross-section over the entire length, use is made of two bearings 17 and 18 which have the same internal and external diameter. The bearing 18 in turn lies against a flange 47 which is at the end of the recess 45 for the bearing 18 facing towards the other bearing 17. Now, as the internal diameter of the recess 44 for the bearing 17 corresponds to the internal diameter of the recess 45, the recess 44 can no longer be ejected from the mould in the same direction as the recess 45 due to the flange 47. It is formed from the opposite direction and now bears its inward-protruding flange 46 at its end facing towards the other recess 45. A comparison between FIGS. 2 and 6 shows clearly that the housing 13 of the embodiment according to FIG. 6 has a greater overall height than the housing 13 of the embodiment according to FIG. 2. This is mainly due the the fact that the cross-section of the slide 16 in FIG. 6 is the same over its entire length.

In the embodiment according to FIG. 6 the connecting rod 30 has a double offset in such a way that the offset section 50, which is shorter than in the embodiment according to FIG. 2, is once more followed by a section 70 which is exactly as close to the slide 16 as the section 50 preceding the offset section 50. As a result the leverage for forces exerted in the direction of rotation by the connecting rod 30 on the slide is reduced. The link pins 29 and 31 which connect the crank 28 with the crankshaft 30 and the connecting rod 30 with the slide 16 respectively are in the example according to FIG. 6 made in the form of spherical pins. The spherical segments 71 are in ball cups 72 which are clipped in at the two ends of the connecting rod 30. The ball-and-socket joints enable the connecting rod 30 to make slight tilting movements in relation to the crank 28 and the slide 16 without anything jamming.

The gear wheel 32 in turn meshes with a gear ring 33 which together with the wall 34, constitutes a single-piece moulded plastic part 73 on which it extends over approximately a semicircle. The plastic part 73 furthermore includes a flat section 74 which is adjacent to this semicircle and supplements it to form a complete circle. The collar 52 is continued on the outer edge of this section 74 so that this collar runs in a circle. The section 74 also adjoins the supporting frame 11, so that good sealing of the housing 35 for the gear wheel 32 and the gear ring 33 is achieved. When the unit is built into the motor vehicle, the housing 35 is sealed on the outside by the contact between the plastic part 73 and the housing 13 and on the side towards the interior of the vehicle by the contact of the plastic part 73 against the supporting frame 11. It is also possible to make the gear ring and the supporting frame in one piece. The gear ring and the supporting frame can then be made both of metal or both of plastic. It is also conceivable that a gear ring of plastic could be injection-moulded directly onto a supporing frame of plastic or metal.

Figure 8:
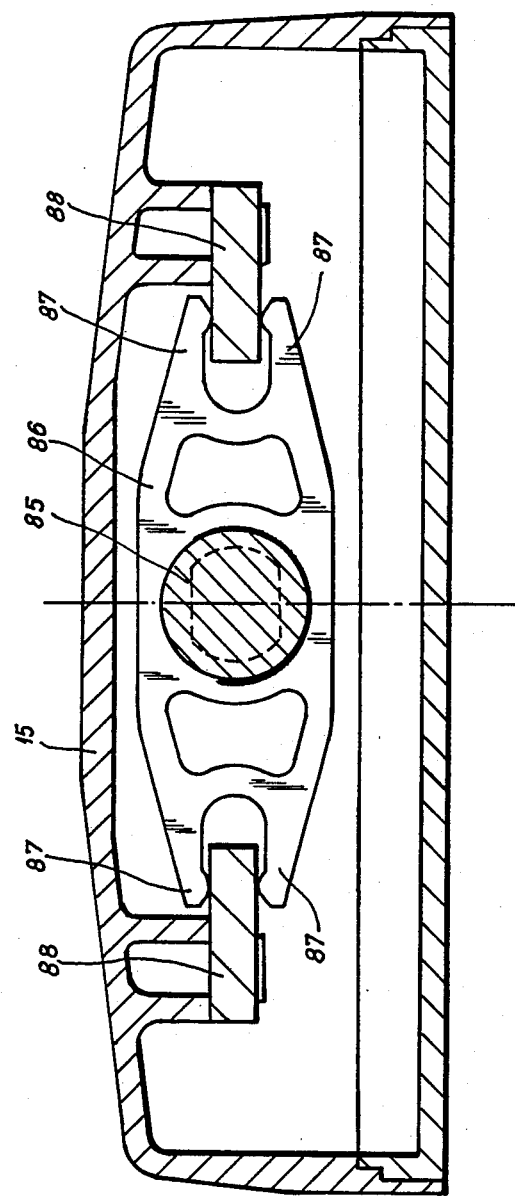
FIG. 8 shows a cross-section along the line VIII—VIII in FIG. 6.

As shown in detail in FIG. 8, in the example according to FIG. 6 the guide of the slide 16 for absorbing torsional forces is a sliding guide. With the aid of a double-flat-sided part 85 at the rear end of the slide 16 a holder 86 of plastic is fixed non-rotatably to the slide 16, two flexible lugs 87 being moulded to the holder 86 on both sides of the slide 16. These lugs enclose, in the manner of clothes pegs, two guide rails 88 which are riveted to supports 89 on the cover 15. In order to obtain low friction it is possible to make the guide rails 88 of metal. The type of guidance shown in FIG. 8 makes it possible to fasten the guide rails 88 to the cover 15 and the holder 86 to the slide 16 without this necessitating the observance of very close tolerances.

Figure 7:
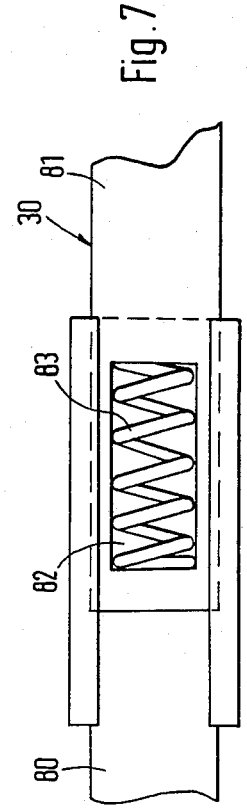
FIG. 7 shows a connecting rod with a built-in damping element.

FIG. 7 shows a modified connecting rod 30. This is composed of two parts 80 and 81 which are passed within each other in a displaceable manner. Both parts contain a longitudinal rectangular recess 82. Normally the two recesses 82 are over each other, overlapping to the same extent. In the recesses there is a compression spring 83 which abuts with each of its ends against two corresponding narrow front faces of the recesses 82 and therefore, due to its pretension, can hold the two parts 80 and 81 of the connecting rod 30 in a fixed position in relation to each other. But if particularly strong pulse-like forces act upon the connecting rod 30, the two parts 80 and 81 can move apart somewhat against the force of the spring 83, thereby softening the impacts caused by the forces. These forces occur particularly at the reversal points of the crank assembly.

What is claimed is:

1. A windshield wiper unit with a wiper arm of telescopic construction comprising:
    a housing adapted to be driven by a driving motor to and fro about an axis of rotation;
    a slide having rear and front ends movable in a telescopic fashion through a stroke distance in relation to said housing;
    front and rear bearings disposed in said housing for supporting said slide;
    said slide having a length at least as long as the distance between said front and rear bearings plus the stroke distance of said slide;
    a connecting rod coupled to said slide;
    a crank coupled to said connecting rod, said crank having a fixed axis of rotation, said crank and said connecting rod being movable to displace said slide in said telescopic fashion;
    said connecting rod being positioned above or below said slide and coupled to said slide betweeen said front and rear bearings at a point spaced from the rear end of said slide; and
    wherein said distance between said front and rear bearings is at least as great as said stroke distance.

2. A windshield wiper unit according to claim 1 wherein:
    the distance between said crnak axis and said rear bearing is smaller than the length of said crank.

3. A windshield wiper unit according to claim 2 wherein:
    said rear bearing is between said front bearing and said crankshaft.

4. A windshield wiper unit according to claim 3 wherein:
    said connecting rod has an offset section with which it passes under said rear bearing.

5. A windshield wiper unit according to claim 4 wherein:
    said connecting rod is doubly offset and the section of said connecting rod which serves for linking to said slide is nearer said slide than said offset section.

6. A windshield wiper unit according to claim 1 wherein:
    said slide has two sections of different cross-section, the section with the smaller cross-section being placed in said rear bearing.

7. A windshield wiper unit according to claim 6 wherein:
    the section of said slide with the larger cross-section is palced in said front bearing and/or;
    the place of linking of said connecting rod to said slide is in the section with the larger cross-section.

8. A windshield wiper unit according to claim 7 wherein:
    said two sections of said slide are formed by two coaxial cylindrical sections.

9. A windshield wiper unit according to claim 1 wherein:
    at least one of said front and rear bearings is a spherical segment bearing.

10. A windshield wiper unit according to claim 1 wherein:
    said housing comprises at least two component parts; and
    said front and rear bearings are in the same one of said component part.

11. A windshield wiper unit according to claim 1 wherein:
    said housing comprises a base-plate and a cover placed on said base plate;
and wherein
    said crankshaft is fixed rotatably in said base plate;
    said wiper shaft being fixed non-rotatably in said base plate.

12. A windshield wiper unit according to claim 10 wherein:
    said cover or said base-plate includes two recesses for receiving said front and rear bearings.

13. A windshield wiper unit according to claim 10 wherein:
    said two recesses each have a flange facing inwards, that the flange of the front recess is on the side facing the rear recess, and the flange of the rear recess is on the side not facing the front recess and said flange of said front recess does not at any place project into the internal cross-section of said rear recess.

14. A windshield wiper unit with a wiper arm of telescopic construction comprising:
    a housing adapted to be driven by a driving motor to and fro about an axis of rotation;

a slide movable in a telescopic fashion through a stroke distance in relation to said housing;

front and rear bearings disposed in said housing for supporting said slide;

said slide having a length at least as long as the distance between said front and rear bearings plus the stroke distance of said slide;

a connecting rod coupled to said slide;

a crank coupled to said connecting rod, said crank having a fixed axis of rotation, said crank and said connecting rod being movable to displace said slide in said telescopic fashion;

said connecting rod being positioned above or below said slide and coupled to said slide betweeen said front and rear bearings;

wherein said distance between said front and rear bearings is at least as great as said stroke distance, and wherein the distance of said crank axis from said rear bearing is greater than the length of said crank; and said crank and said connecting rod are on opposite sides of said slide.

15. A windshield wiper unit according to claim 1 comprising:

a guide for absorbing torsional forces operating on said slide to prevent twisting is provided for said slide.

16. A windshield wiper unit according to claim 15 comprising:

a guide element on a pin for linking said connecting rod and said slide to each other.

17. A windshield wiper unit with a wiper arm of telescopic construction comprising:

a housing adapted to be driven by a driving motor to and fro about an axis of rotation;

a slide movable through a stroke distance in a telescopic fashion in relation to said housing;

front and rear bearings disposed in said housing for supporting said slide;

said slide having a length at least as long as the distance between said front and rear bearings plus the stroke distance of said slide;

a connecting rod coupled to said slide;

a crank coupled to said connecting rod, said crank having a fixed axis of rotation, said crank and said connecting rod being movable to displace said slide in said telescopic fashion;

said connecting rod being positioned above or below said slide and coupled to said slide betweeen said front and rear bearings;

wherein said distance between said front and rear bearings is at least as great as said stroke distance; and a guide for absorbing torsional forces operating on said slide to prevent twisting of said slide, said guide including two guide elements disposed on opposite sides of said slide and carried on a support, said support bearing arranged approximately in a plane lying parallel to the plane of movement of said crank and being fixed in its middle to said slide in a non-rotatable manner.

18. A windshield wiper unit according to claim 17 wherein:

each of said two guide elements are supported against said housing in both opposite directions of said torsional forces.

19. A windshield wiper unit according to claim 18 comprising:

at least one roller bearing serving as a guide element and running in a guide groove of the housing.

20. A windshield wiper unit according to claim 18 wherein:

said two guide elements each include two spring lugs each of which encompasses a guide rail on said housing like a clothes pin and each two lugs being moulded in a single piece to a support, said support being fixed to the slide in a non-rotatable manner.

21. A windshield wiper unit according to claim 17 wherein:

said support is fixed at the rear end of said slide.

22. A windshield wiper unit according to claim 15 wherein:

said slide has at least one guide groove in it; and a ball held on said housing engages said groove.

23. A windshield wiper unit according to claim 1 wherein:

said crank has a counter-weight positioned beyond its axis.

24. A windshield wiper unit according to claim 1 comprising:

a damping element is inserted in said connecting rod.

25. A windshield wiper unit according to claim 1 wherein:

said crank and said connecting rod are coupled by a ball and socket joint; and said connecting rod and said slide are coupled by a second ball-and-socket joint.

26. A windshield wiper unit according to claim 1 comprising:

a gear coupled to said crank;

a second housing contacting said gear;

said housing and said second housing engaging in each other in a labyrinth-like manner, said second housing engaging in the housing only with a collar.

27. A windshield wiper unit according to claim 1 comprising:

a supporting frame, a bearing bush included in said frame for said wiper shaft and;

a gear ring belonging to the gear fixed to said frame.

28. A windshield wiper unit according to claim 27 wherein:

said gear ring is toothed internally and is joined to said housing.

29. A windshield wiper unit according to claim 28 wherein:

said gear ring is semicircular and formed on a part made up by a flat section into a full circle, said part lies in the shape of a ring against said housing.

30. A windshield wiper unit according to claim 27 wherein:

said gear ring is made as one piece with a supporting frame.

31. A windshield wiper unit according to claim 27 wherein:

said gear ring is moulded onto a supporting frame.

32. A windshield wiper unit according to claim 27 wherein:

said gear ring is made of plastic.

33. A windshield wiper unit according to claim 1 wherein:

said housing covers said second housing both with a plate on said base-plate and with a plate on said cover.

34. A windshield wiper unit according to claim 33 wherein:

an annular slot is formed by a shoulder on both said plate and said base plate, a shoulder of said second housing engages said slot.

* * * * *